United States Patent
Skow et al.

(10) Patent No.: US 11,365,971 B2
(45) Date of Patent: Jun. 21, 2022

(54) AIRCRAFT ENERGY STATE AWARENESS DISPLAY SYSTEMS AND METHODS

(71) Applicant: Tiger Century Aircraft, Inc., Tehachapi, CA (US)

(72) Inventors: Andrew M. Skow, Tehachapi, CA (US); Peter T. Reynolds, Goddard, KS (US)

(73) Assignee: Tiger Century Aircraft, Inc., Tehachapi, CA (US)

( * ) Notice: Subject to any disclaimer, the term of this patent is extended or adjusted under 35 U.S.C. 154(b) by 623 days.

(21) Appl. No.: 15/821,394

(22) Filed: Nov. 22, 2017

(65) Prior Publication Data

US 2018/0094932 A1 Apr. 5, 2018

Related U.S. Application Data

(63) Continuation of application No. PCT/US2016/033663, filed on May 20, 2016.

(60) Provisional application No. 62/165,781, filed on May 22, 2015.

(51) Int. Cl.
 *G01C 21/00* (2006.01)
 *G01C 21/10* (2006.01)
 *G01C 23/00* (2006.01)
 *B64D 45/04* (2006.01)

(52) U.S. Cl.
 CPC .............. *G01C 21/10* (2013.01); *B64D 45/04* (2013.01); *G01C 23/00* (2013.01)

(58) Field of Classification Search
 None
 See application file for complete search history.

(56) References Cited

U.S. PATENT DOCUMENTS

| | | | |
|---|---|---|---|
| 4,021,009 A | 5/1977 | Baker et al. | |
| 5,225,829 A | 7/1993 | Bateman | |
| 5,353,022 A | 10/1994 | Middleton et al. | |
| 8,234,068 B1 * | 7/2012 | Young | G08G 5/0091 |
| | | | 701/528 |
| 9,243,910 B1 * | 1/2016 | Esno | G01S 13/933 |

(Continued)

OTHER PUBLICATIONS

"International Search Report and Written Opinion of the International Searching Authority dated Aug. 19, 2016; International Application No. PCT/US2016/033663", Aug. 19, 2016.

*Primary Examiner* — Truc M Do
(74) *Attorney, Agent, or Firm* — Womble Bond Dickinson (US) LLP (57) ABSTRACT

An Energy State Awareness System that alerts the pilot of an aircraft during the climb, cruise and descent phases of a flight of low airspeed conditions, and during the Approach/Landing and Go-Around phases of flight when airspeed has deviated from a pre-determined reference airspeed that is considered "Stable" for the flight conditions. In order to determine the degree of deviation, the system monitors some of various readily available signals representative of flight parameters and of the aircraft's configuration such as true airspeed, weight, flap position, center of gravity and normal load factor—$n_z$. Some signals are used directly, others are used as inputs to internal algorithms that compute the data necessary to determine the magnitude of the deviations.

22 Claims, 4 Drawing Sheets

(56) References Cited

U.S. PATENT DOCUMENTS

| | | | |
|---|---|---|---|
| 2003/0048203 A1* | 3/2003 | Clary | G01C 23/00 340/945 |
| 2003/0127557 A1* | 7/2003 | Anderson | B64D 43/00 244/1 R |
| 2003/0179109 A1* | 9/2003 | Chamas | G01C 23/005 340/973 |
| 2003/0193411 A1 | 10/2003 | Price | |
| 2007/0008188 A1* | 1/2007 | Firra | G01D 7/002 340/973 |
| 2009/0248297 A1* | 10/2009 | Feyersisen | G01C 23/00 701/467 |
| 2013/0106832 A1* | 5/2013 | Meeker | G06T 17/05 345/419 |
| 2013/0335243 A1 | 12/2013 | Smyth, IV et al. | |
| 2014/0168608 A1* | 6/2014 | Disley | G03B 21/32 352/132 |
| 2015/0045989 A1* | 2/2015 | Polansky | G01C 23/00 701/2 |

* cited by examiner

AIRCRAFT ENERGY STATE AWARENESS DISPLAY SYSTEMS AND METHODS

CROSS-REFERENCE TO RELATED APPLICATIONS

This application is a continuation of International Application No. PCT/US2016/033663 filed May 20, 2016 which claims the benefit of U.S. Provisional Patent Application No. 62/165,781 filed May 22, 2015.

BACKGROUND OF THE INVENTION

1. Field of the Invention

The present application relates to the fields of low airspeed alerting systems and stable approach monitoring systems for aircraft.

2. Prior Art

Worldwide commercial aircraft hull losses and fatalities have been steadily decreasing since 1996. However, fatal Loss of Control—In Flight (LoC-I) accidents continue to rank as the #1 killer and Approach and Landing Accidents (ALAs) have increased over the last 7 years and now rank as the #3 killer. Researchers at NASA have found that "poor energy (airspeed) management" on the part of the pilot(s) was a significant contributing factor in many LoC-I and ALA accidents.

The FAA requires the installation of multi-sensory low airspeed alerting systems in all transport category aircraft applying for certification after 2010. The NTSB has recommended installation of low airspeed alerting systems in all airliners including those certified before 2010.

A Minimum Safe Airspeed:

The lowest airspeed at which the aircraft can maintain level flight is referred to as the stall airspeed. It is widely accepted in the aircraft industry that aircraft should be flown in a manner that maintains a comfortable margin of safety above the stall airspeed. This margin is typically at least 30%.

To maintain an airspeed that is above the minimum safe airspeed, pilots must first have an indication that airspeed is approaching an unsafe level.

Present aircraft include instrumentation that displays information that will indicate a threatening rate of decrease in airspeed or a trend toward an unsafe airspeed of the aircraft. However this instrumentation has proven to be inadequate in some situations. For the airspeed information that is displayed on such displays to be understood, a pilot must perform a "reading and mental comprehension" task. This task takes time and diverts the pilot's attention away from other tasks such as aligning the aircraft with the runway. In addition, the airspeed display is positioned in a somewhat cluttered location, and cannot be read without the pilot diverting his line-of-sight away from the "out-the-window" view. While voice warnings are also provided, voice warnings may be ignored, or not appreciated for what they are until it is too late.

A Stable Approach Airspeed:

An Approach to a Landing is considered Stable only if a series of important flight parameters are achieved and maintained after reaching an appropriate height above and/or distance from the runway. These flight parameters include: airspeed, climb or descent rate, bank angle, pitch angle, side-to-side alignment relative to the runway centerline and vertical position above/below the glideslope.

Of these parameters, airspeed is one of the most important parameters that must be maintained within a pre-determined reference (or optimum) during the Approach. This pre-determined reference airspeed is sometimes called Vref. An approach is characterized as Unstable if the airspeed deviates too far above or below Vref. Different aircraft manufacturers, airlines and regulatory agencies recommend different allowable deviations, but in most cases, the Approach must never be flown at an airspeed that is faster than 10-20 knots above or slower than 0-5 knots below Vref.

According to Airbus, continuing an Unstabilized approach has been identified as a causal factor in 40% of all Approach/Landing accidents. In 75% of the off-runway touchdown, tail strike or runway excursion/overrun accidents, the major cause was an Unstable approach. In 66% of these accidents, airspeed deviation outside of the recommended range around Vref has been identified as a major causal factor.

An example of the problem was Asiana Airlines Flight 214. This was a scheduled transpacific passenger flight from Incheon, South Korea that crashed on final approach to San Francisco International Airport on Jul. 6, 2013. Of the 307 people aboard the Boeing 777, two passengers died at the crash scene (one from being run over by a fire truck), and a third died in a hospital several days later. One hundred and eighty one others were injured, 13 of them critically. Among the injured were three flight attendants who were thrown onto the runway while still strapped in their seats when the tail section broke off after striking the seawall short of the runway. The National Transportation Safety Board (NTSB) concluded that the three pilot's inattention to airspeed during this critical phase of flight was a major contributing factor.

DETAILED DESCRIPTION OF THE PREFERRED EMBODIMENTS

Overall Concept

The overall concept of the Aircraft Energy State Awareness (AESA) Display System is to provide Visual (and Aural) alerts to the pilot(s) of an aircraft that can help them maintain an airspeed that is above a minimum safe airspeed in the Climb, Cruise and Descent phases of flight (the Low Airspeed Alert mode) and minimize the deviations in their airspeed from an "optimum" airspeed appropriate to the Approach, Landing and Go-Ahead phases of flight (Stable Approach Monitor mode).

In one embodiment of the Low Airspeed Alerting (LAS) mode, the present invention is a visual and aural alerting system for improving the energy state awareness of aircraft pilots during the climb, cruise and descent phases of a flight. Specifically, when the aircraft has ascended though an altitude that is above a predetermined reference altitude, the AESA Display system becomes active and continuously compares the measured airspeed of the aircraft to a recommended minimum safe airspeed that is determined from information that is readily available from the aircraft data Bus as augmented by information that is stored internally to the AESA Display System.

In an embodiment of the Stable Approach Monitor (SAM) mode, the present invention is a visual and aural alerting system for improving energy state awareness of aircraft pilots during the approach, landing and go-around phases of a flight. Specifically, when the aircraft has descended through an altitude that is below a predetermined reference altitude, the AESA Display system becomes active and continuously compares the measured airspeed of the aircraft to a reference approach airspeed (called Vref or Vapp) that is readily available from the aircraft data Bus, augmented by information that is stored internally to the AESA Display System.

Visual and Aural Advisories

In both the LAS and SAM modes of the AESA Display system, visual and aural advisories are presented that inform a pilot about the relationship between the current measured airspeed of the aircraft and either a minimum safe airspeed or an optimum airspeed, depending on the phase of flight.

High Airspeed:

In the LAS mode, if the measured airspeed is higher than the recommended minimum safe airspeed by a predetermined margin, no visual or aural advisory is generated.

In the SAM mode, if the measured airspeed is higher than the recommended reference approach airspeed by an amount that is greater than a predetermined allowable range, a visual advisory is generated by the AESA display to alert the pilot that the approach speed is above "stable" limits. Under these conditions, the AESA display system will generate a visual advisory by the display illuminating to a flashing Blue color although other colors may be used. The AESA display system will also generate an aural advisory to the pilot. In the preferred embodiment, the aural advisory is in the form of the spoken words "Airspeed Fast" although other aural advisories may be used.

Optimum Airspeed:

In the LAS mode, if the measured airspeed is higher than the recommended minimum safe airspeed but within a predetermined margin, a visual advisory is generated by the AESA display illuminating to a solid Green color although other colors may be used. No aural advisory is provided.

In the SAM mode, if the measured airspeed is within the predetermined acceptable range above and below Vref (or Vapp), a visual advisory is generated by the AESA display illuminating to a solid Green color although other colors may be used. No aural advisory is generated.

Low Airspeed:

In the LAS mode, if the measured airspeed is lower than the recommended minimum safe airspeed by a predetermined margin, a visual advisory is generated by the AESA display to alert the pilot that the measured airspeed is below "safe" limits. Under these conditions, the AESA display system will generate a visual advisory by the display illuminating to Yellow, although other colors may be used. The AESA display system will also generate an aural advisory to the pilot. In the preferred embodiment, the aural advisory is in the form of the word "Airspeed" which will be spoken at a rate of once every two seconds although other aural advisories may be used.

In the SAM mode, if the measured airspeed of the aircraft is below the predetermined acceptable range below Vref but above a predetermined range above the stall airspeed Vstall, a visual advisory is generated by the AESA display to alert the pilot that the approach speed is below "stable" limits. Under these conditions, the AESA display system will generate a visual advisory by the display illuminating to Yellow, although other colors may be used. The AESA display system will also generate an aural advisory to the pilot. In the preferred embodiment, the aural advisory is in the form of the word "Airspeed" which will be spoken at a rate of once every two seconds although other aural advisories may be used.

Very Low Airspeed:

In the LAS mode, if the measured airspeed is below a predetermined range above the stall airspeed Vstall, a visual advisory is generated by the AESA display to alert the pilot that the measured airspeed is in an unsafe range. Under these conditions, the AESA display system will generate a visual advisory by the display illuminating to a flashing Yellow, although other colors may be used. The AESA display system will also generate an aural advisory to the pilot. In the preferred embodiment, the aural advisory is in the form of the word "Airspeed" which will be spoken at a rate of once every second although other aural advisories may be used.

In the SAM mode, if the measured airspeed of the aircraft is below a predetermined range above the stall airspeed Vstall, a visual advisory is generated by the AESA display to alert the pilot that the approach airspeed is in an unsafe range. Under these conditions, the AESA display system will generate a visual advisory by the display illuminating to a flashing Yellow, although other colors may be used. The AESA display system will also generate an aural advisory to the pilot. In the preferred embodiment, the aural advisory is in the form of the word "Airspeed" which will be spoken at a rate of once every second although other aural advisories may be used.

Stall Airspeed:

In both the LAS and SAM modes, if the measured airspeed of the aircraft reduces until it is equal to or less than the stall airspeed of the aircraft Vstall, the AESA display will generate a visual warning by the display illuminating solid Red. No aural advisory will be generated.

Display Position:

In a preferred embodiment, the AESA display is located on the glare shield of the aircraft in a position that does not interfere with the pilot's visibility but is within the pilot's near-peripheral vision while looking out of the window at the runway. Other locations can be utilized for the AESA display so long as it is located within the pilot's near-peripheral vision when looking out the window at the runway. In a transport-category aircraft, two (2) AESA displays will be installed, one for the pilot in the left seat and one for the pilot in the right seat.

The tables below summarize the scheduling of the Aural and Visual advisories provided by the AESA Display in one embodiment for both the LAS and SAM modes.

| Altitude | Airspeed | Visual | Aural |
|---|---|---|---|
| Alert Schedule-Low Airspeed Alerting (LAS) Mode | | | |
| <500 feet | | Off (Dark) | Silent |
| >500 feet ascending | $V > 1.4\, V_{stall}$ | Off (Dark) | Silent |
| | $1.4\, V_{stall} < V < 1.3\, V_{stall}$ | Solid Green | Silent |
| | $1.3\, V_{stall} < V < 1.2\, V_{stall}$ | Solid Yellow | "Airspeed" (½ Hz) |
| | $1.2\, V_{stall} < V < V_{stall}$ | Flashing Yellow | "Airspeed" (1 HZ) |
| | $V < V_{stall}$ | Solid Red | Silent |
| Alert Schedule-Stable Approach Monitor (SAM) Mode | | | |
| >1,000 feet | | Off (Dark) | Silent |
| <1,000 feet descending | $V > (V_{ref} + 10)$ | Flashing Blue | "Airspeed" (½ Hz) |
| | $(V_{ref} + 10) < V < (V_{ref} - 5)$ | Solid Green | Silent |
| | $V < (V_{ref} - 5)$ | Solid Yellow | "Airspeed" (½ Hz) |
| | $V < (V_{ref} - 15)$ | Flashing Yellow | "Airspeed" (1 HZ) |
| | $V < V_{stall}$ | Solid Red | Silent |

All of the data needed to determine the energy state information is either directly available from the aircraft data bus of commercial aircraft, or can be easily derived from these data using algorithms that are contained within the exemplary AESA Display system. For general aviation, all of the data needed to determine the energy state information is easily derived from available data with minimal additional instrumentation easily retrofitted to existing aircraft, again using algorithms that are contained within the exemplary AESA Display system.

Figure 1:
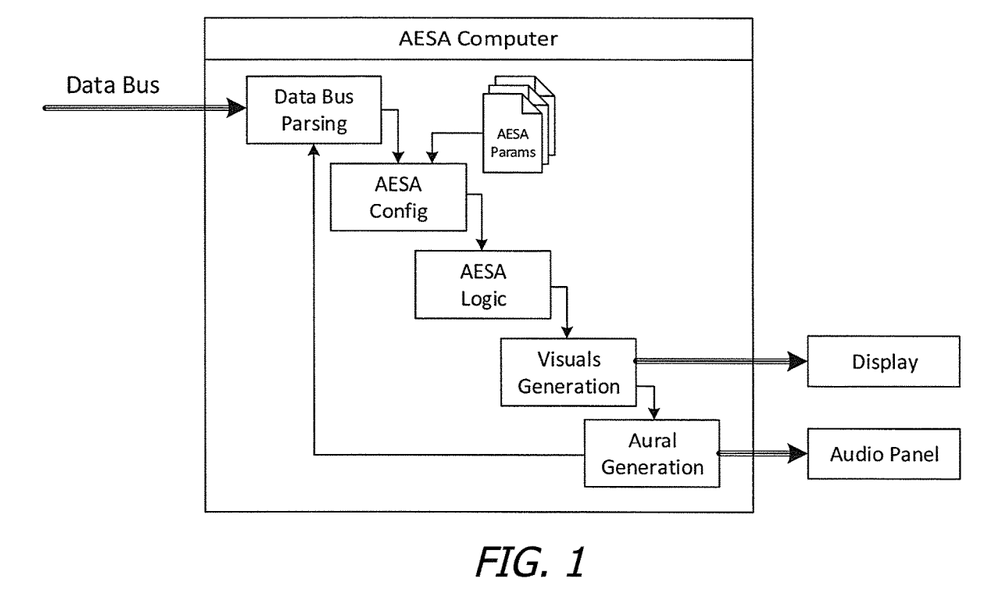
FIG. 1 is a block diagram of an exemplary system in accordance with the present invention.

A block diagram of an exemplary system for commercial aircraft may be seen in FIG. 1. In accordance with that diagram, a relatively simple controller is coupled to the aircraft bus and to the two displays of the exemplary system. The controller would include at least one lookup table for stall airspeed versus weight for various flap positions, additional memory for program and constant storage, and of course memory for temporary use by the controller processor.

For the Display system to function, it needs to know or derive seven airspeeds, namely:

V (the airspeed at which the aircraft is flying. This normally would be indicated airspeed, though true airspeed could be used—see FIGS. 2A and 2B. On commercial aircraft, airspeed as well as flap setting, throttle setting, weight and altitude, among other things, are available from the aircraft bus).

Figure 3:
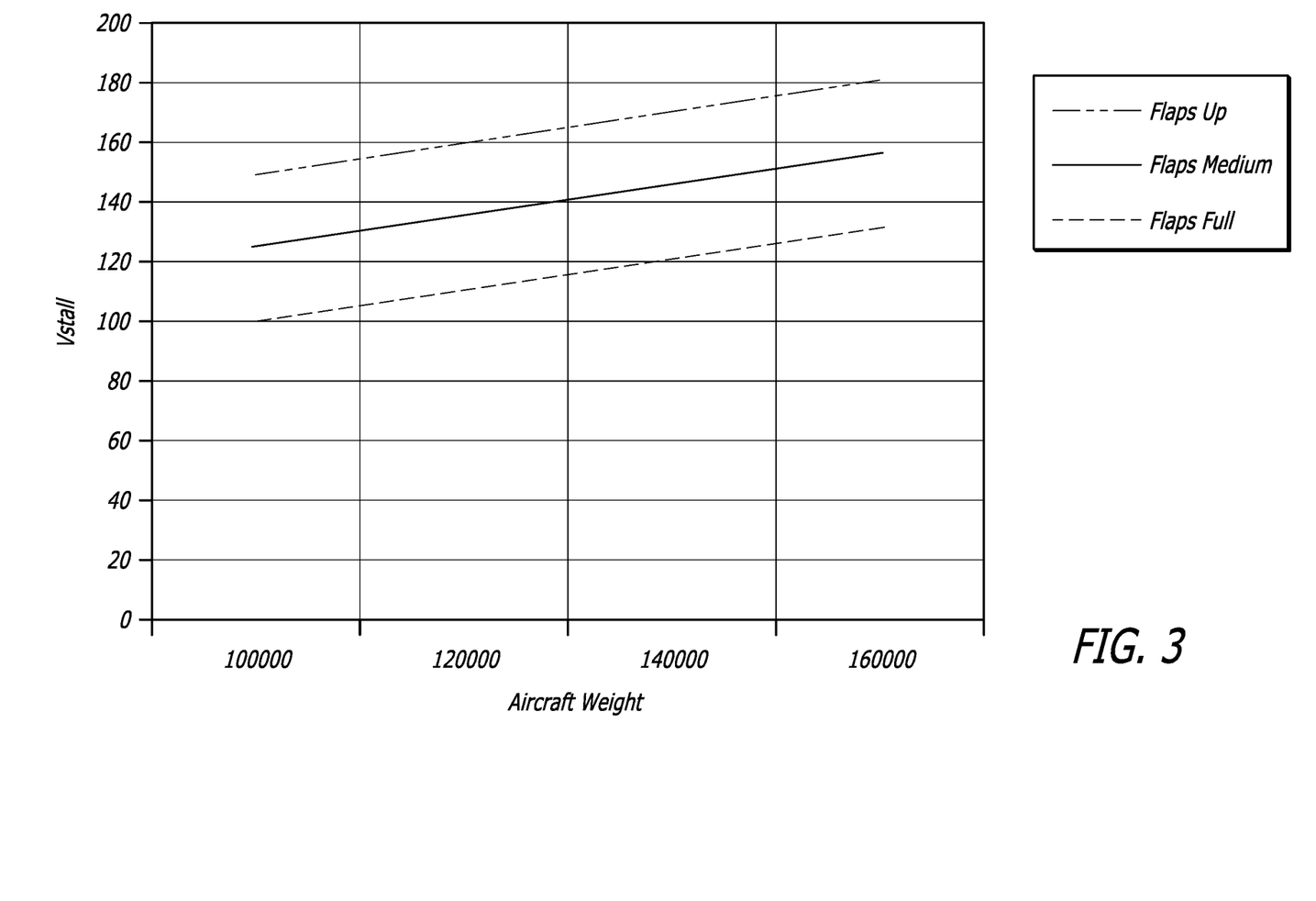
FIG. 3 is a graph illustrating representative curves of the 1 g (level flight) Vstall versus aircraft weight for various flap positions.

$V_{stall}$ (the airspeed that corresponds to the minimum certificated airspeed for the aircraft—it can be the aerodynamic stall airspeed or the airspeed at which the stick shaker activates. Stall speed $V_{stall}$ is determined by accessing a data base that is pre-loaded into the AESA Display memory, the primary factors affecting stall speed being weight, flap position and normal load factor $n_z$. As an example, FIG. 3 presents curves for the 1 g (level flight) stall speed $V_{stall}$ versus aircraft weight for various flap settings for one model of aircraft. Other parameters also have some influence on stall speed, such as landing gear position, center of gravity, outside air temperature and altitude, which parameters could be considered in some embodiments. On commercial aircraft, weight, flap position and normal load factor $n_z$ are also available from the aircraft bus. The curves for stall speed versus weight for different flap positions are quite linear, so the 1 g (level flight) stall speed can be determined for any weight and flap position using a minimal look-up table. The effect of normal load factor $n_z$ on stall airspeed is obtained by multiplying the 1 g stall airspeed by the square root of normal load factor $n_z$.

$V_{ref}$ (the recommended approach airspeed that is appropriate for the aircraft's weight and flap position) can be taken directly from the aircraft's data Bus, or can be calculated using the equation: $V_{ref}=K1*V_{stall}$ (K1 is usually 1.3). The effect of normal load factor $n_z$ is obtained by multiplying $V_{stall}$ times the square root of normal load factor $n_z$.

$\Delta V_{refplus}$ (the maximum allowable deviation above the recommended approach airspeed $V_{ref}$ recommended by the aircraft manufacturer or operator that is loaded into the internal memory of the AESA Display) (typically between 10 and 20 knots above the reference airspeed)

$\Delta V_{refminus}$ (the maximum allowable deviation below the recommended approach airspeed $V_{ref}$ recommended by the aircraft manufacturer or operator that is loaded into the internal memory of the AESA Display) (typically between zero and 5 knots below the reference airspeed)

$\Delta V_{minimum}$ (a recommended minimum increment above the stall airspeed calculated internally by the AESA Display using the equation: $V_{minimum}=K2*V_{stall}$) (K2 is usually 1.2)

$\Delta V_{dynamic}$ (an incremental adjustment to the allowable maximum deviation above or below Vref that takes into consideration the rate of change of airspeed and changes in Throttle Lever Angle (ΔTLA) calculated internally by the AESA Display using the equation: $V_{dynamic}=K3*V_{dot}+K4*\Delta TLA$, where $V_{dot}$ is the rate of change of airspeed. In some embodiments, the rate of change of altitude may also be considered in determining $\Delta V_{dynamic}$.

Exemplary Operational Sequence for the Low Airspeed Alerting (LAS) mode

1: Initiate

As the aircraft ascends through a predetermined altitude (500 feet example), the Aircraft Energy State Awareness (AESA) Display System is activated. Below this altitude, the AESA (stable approach monitor mode) is powered on, but is "dark" and "silent".

2: Determine Vstall

Using weight and flap position that are readily available from the aircraft data Bus, the AESA Display system uses an internal table look up to determine the stall airspeed. If stall airspeed is a parameter that is available on the aircraft data Bus, then than value is used.

3: Adjust for Normal Load Factor

If the normal load factor $n_z$ is greater than 1 (as it would be in turning flight), the stall airspeed increases. Accordingly, the AESA display system adjusts the stall airspeed from the table look-up for the effect of a normal load factor that is greater than 1.

4. Determine Vminsafe

An appropriate airspeed margin is then added to Vstall to determine the recommended minimum safe airspeed. A typical margin of safety that is used in the aviation industry is 30%

5: Adjust for Dynamics

Based on the magnitudes and trends in certain parameters that are readily available from the aircraft (such as rate of change of airspeed and throttle transient), the range of acceptable deviation from the minimum safe airspeed ($\Delta V_{dynamic}$) is adjusted for dynamic effects. Note that the adjustment for dynamics as described herein, while preferable to minimize unnecessary changes in the display, is optional, as a pilot will also be aware of the fact that the throttle has just been advanced while the display just indicated a low airspeed, or that the aircraft is a bit high, having the kinetic energy to convert to airspeed by lowering the aircraft's nose.

6: Compare

The AESA Display System then compares the current airspeed to the recommended minimum safe airspeed and determines the magnitude of the deviation (above or below).

7: Generate Alerts

Based on the magnitude of the deviation from the recommended minimum safe airspeed and the current altitude of the aircraft, the AESA Display System presents Visual and Aural alerts to the Pilots.

Exemplary Operational Sequence for the Stable Approach Monitor Mode

1: Initiate

As the aircraft descends through a predetermined altitude (1,000 feet example), the Aircraft Energy State Awareness (AESA) Display System is activated. Above this altitude, the Energy State Awareness System (stable approach monitor mode) is powered on, but is "dark" and "silent".

2: Determine Vref

Using certain parameters (such as weight and flap position) that are readily available from the aircraft data bus, the AESA Display System calculates the "reference approach airspeed" (Vref) that is appropriate to the conditions. If the aircraft is equipped with an internal system (such as a Flight Management System) that computes Vref, then this value is used.

3: Determine Allowable Airspeed Deviation

Using information provided by the aircraft manufacturer or the aircraft operator, a range of acceptable approach airspeed deviation from Vref is determined.

4: Adjust for Normal Load Factor

The recommended reference approach airspeed is directly related to the stall airspeed appropriate to the flight conditions. The stall airspeed is increased if the normal load factor $n_z$ on the aircraft is greater than 1. Accordingly, the AESA display system adjusts Vref to account for a normal load factor greater than 1.

5: Adjust for Dynamics

Based on the magnitudes and trends in certain parameters that are readily available from the aircraft (such as rate of change of airspeed and throttle transient), the range of acceptable deviation from the reference approach airspeed ($\Delta V_{dynamic}$) is adjusted for dynamic effects. By way of example, if the aircraft speed crosses the green to yellow threshold, but the throttles have already been advanced, the display may still display green in anticipation that the condition will soon be rectified without further pilot action. Note that the adjustment for dynamics as described herein, while preferable to minimize unnecessary changes in the display, is optional, as a pilot will also be aware of the fact that the throttle has just been advanced while the display just indicated a low airspeed, or that the aircraft is a bit high, having the kinetic energy to convert to airspeed by lowering the aircrafts nose.

6: Compare

The AESA Display System then compares the current airspeed to the reference airspeed and determines the magnitude of the deviation (above or below).

7: Generate Alerts

Based on the magnitude of the deviation from the reference approach airspeed and the current altitude of the aircraft, the AESA Display System presents Visual and Aural alerts to the Pilots.

Figure 4:
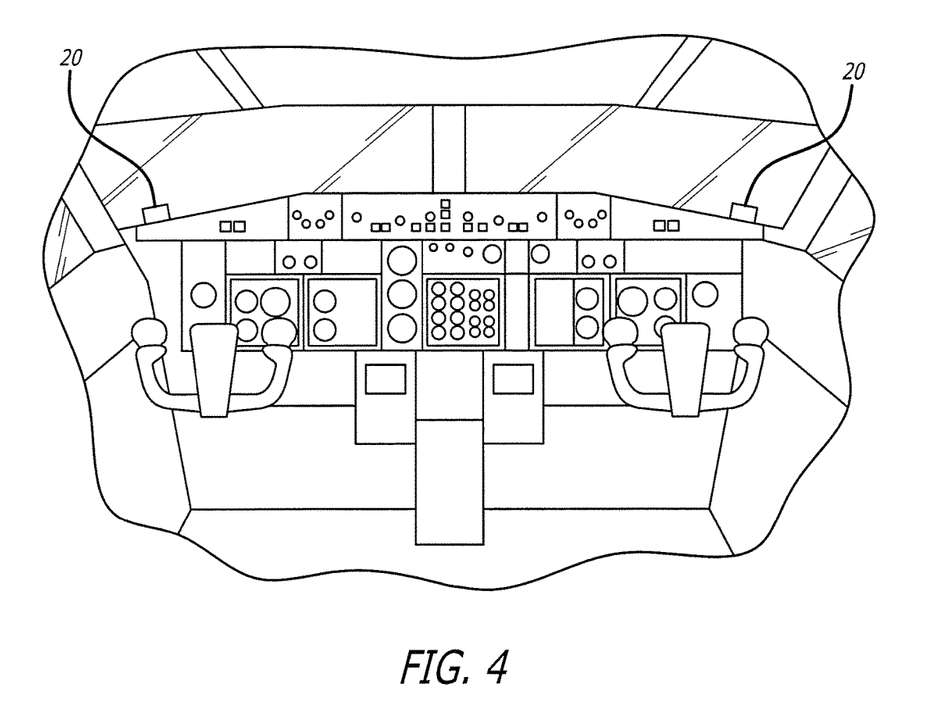
FIG. 4 is an illustration of a preferred location for the displays of the present invention.

The Visual and Aural alerts are designed to be easily seen/heard and understood by the pilot(s) without the need to alter head or eye position. In that regard, FIG. 4 illustrates one exemplary location of the displays 20, namely at the lower outer corners of the front windows as shown in FIG. 4 so as to be viewable (and understandable) in a pilot's peripheral vision, preferably the pilot's near-peripheral vision without head movement, whether looking ahead or out a side window.

Figure 2A:
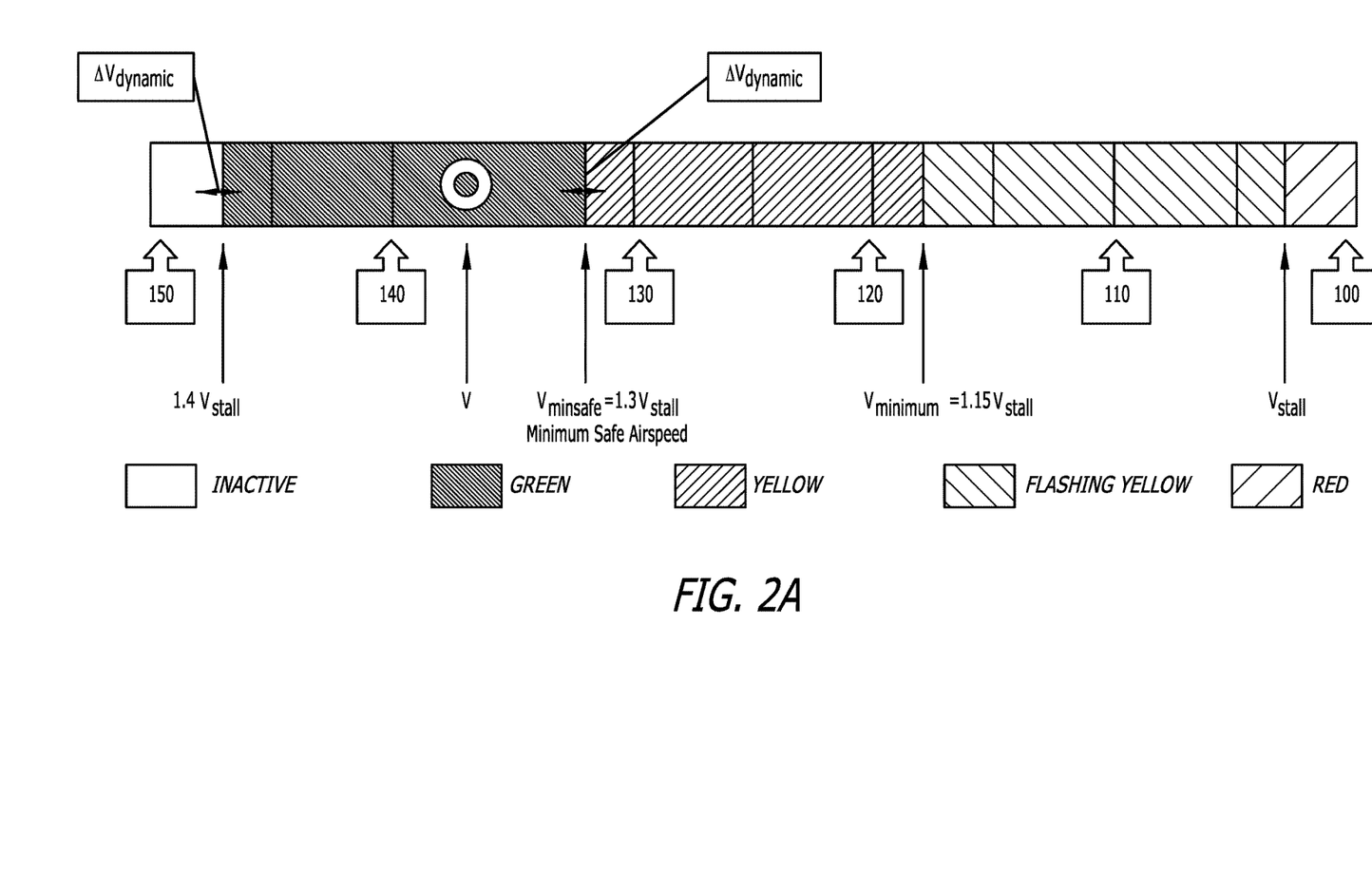
FIG. 2A is an illustration of an exemplary display illustrating the displayed information and the applicable equations for the transitions involved for an exemplary Low Airspeed Alerting (LAS) embodiment.
Figure 2B:
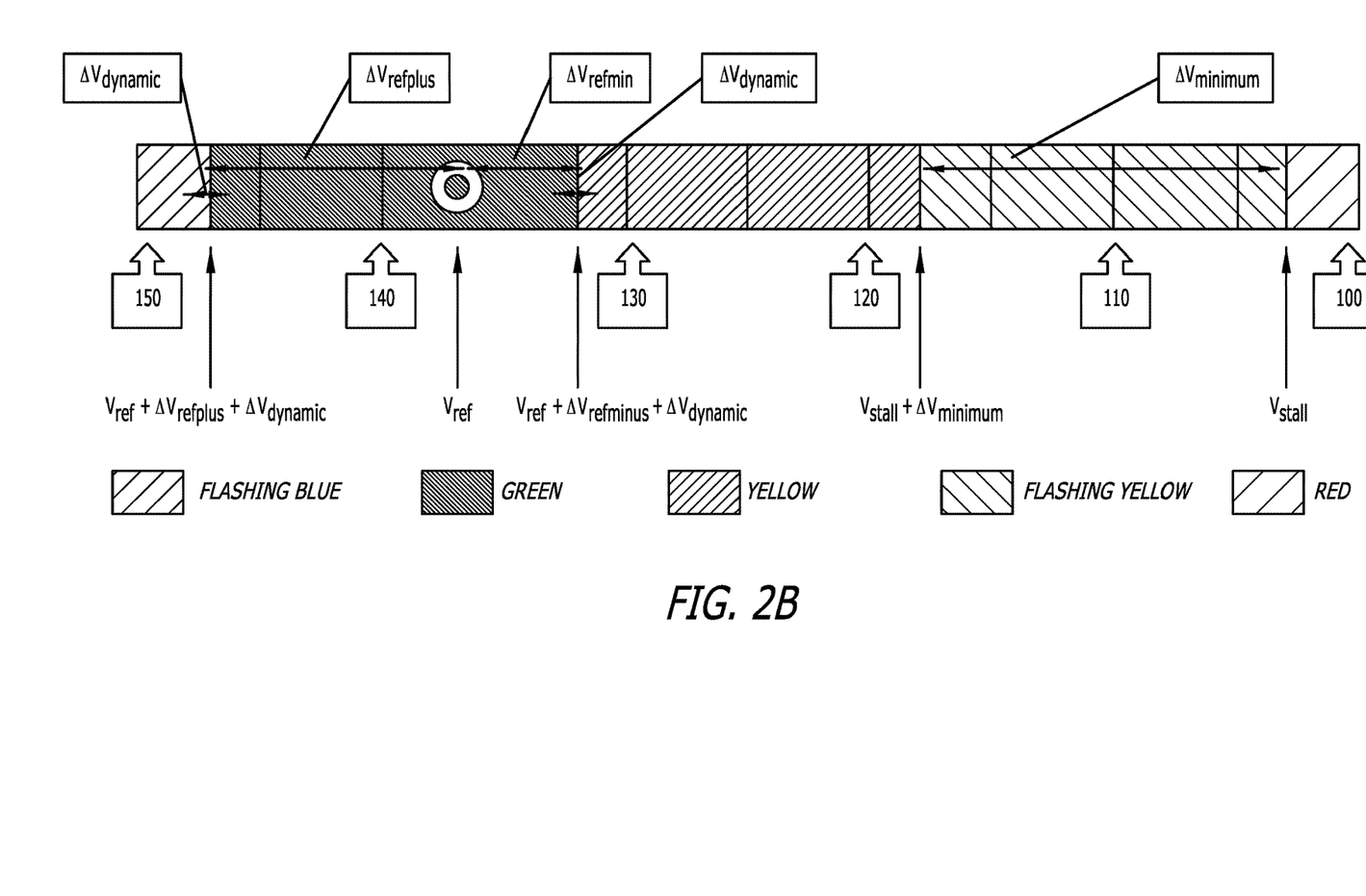
FIG. 2B is an illustration of an exemplary display illustrating the displayed information and the applicable equations for the transitions involved for an exemplary Stable Approach Monitoring (SAM) embodiment.

The Visual alerts are also designed to communicate a sense of increasing urgency if the magnitude of the deviation is above certain pre-determined levels. A preferred visual alert is the green, yellow and red combination of colors as illustrated in FIG. 2A for the LAS mode and FIG. 2B for the SAM mode, similar to a stop light, which colors simply by their presence within the pilot's field of view and without requiring the pilot to move the head, conveys the information desired to be conveyed. Also in general, a very simple "graphical" display, the meaning of which will be immediately understood without diverting the pilot's attention and without requiring any "reading" to understand its message, should be used, as that is a strong feature of the invention. Immediate understanding can lead to immediate action, even when the pilot has a high cognitive load (as is usually the case during the Approach/Landing phases of a flight).

Thus for the SAM, the alert thresholds, as shown in FIG. 2, are:

Flashing blue if: $V>(V_{ref}+\Delta V_{refplus}+\Delta V_{dynamic})$
Green if: $V<(V_{ref}+\Delta V_{refplus}+\Delta V_{dynamic})$ and $V>(V_{ref}+\Delta V_{refminus}+\times V_{dynamic})$
Yellow if: $V<(V_{ref}+\Delta V_{refminus}+\Delta V_{dynamic})$
Flashing Yellow if: $V<(V_{stall}+\Delta V_{minimum})$
Red if: $V \leq (V_{stall})$ The total instantaneous energy state of an aircraft is comprised of Kinetic Energy (in the form of airspeed), Potential Energy (in the form of altitude) and Chemical Energy (in the form of forward thrust that is created when a fuel-air mixture is burned in the engines).

The total future energy state of an aircraft is determined by both the instantaneous magnitudes and the rates of change of these forms of energy. The algorithms in the AESA Display System compare the actual energy state of the aircraft to a reference (optimum) energy state ($V_{ref}$) that is appropriate to the flight conditions and determines whether the observed deviations of the actual energy state of the aircraft (above or below the reference energy state) have exceeded threshold values. These algorithms consider both the instantaneous energy state of the aircraft as well as dynamic energy state trends in determining whether threshold values have been exceeded. As disclosed herein, the various parameters used may be determined, by way of example, by coupling the system to the aircraft bus, by calculation using data from the aircraft manufacturer or aircraft operator, by measurement, or a combination of the foregoing.

When pre-determined energy state thresholds are exceeded, the airspeed is said to have become Unsafe. When this occurs, this information is presented to the pilot(s) using a simplified visual display that uses four (4) colors: Blue, Green, Yellow and Red. Depending on the magnitude of the energy state deviations, the display may present solid colors or colors that flash at different frequencies. These simplified and uncluttered display formats have been selected so that the energy state information that they represent can be easily seen and properly interpreted by the pilot(s) in a short time period, even when operating with a high cognitive load.

Thus there has been described herein an Aircraft Energy State Awareness Display System to provide Visual and Aural alerts to the pilot(s) of an aircraft that can help them minimize the deviations in their actual airspeed from a "safe" airspeed during Climb, Cruise and Descent phases of flight and an "optimum" airspeed during the Approach and Landing and Go-Around phases of flight. The Aircraft Energy State Awareness Display systems are also designed to be visibly perceivable and easily understood without distracting a pilot's attention and to communicate a sense of increasing urgency if the magnitude of the deviation is above certain pre-determined levels. The Aircraft Energy State Awareness Display Systems are also in fact intended to aide in distracting a pilot's inattention, a major factor in many accidents.

The AESA Display Systems of the present invention as disclosed herein are exemplary only, as various changes and additions may be made without departing from the scope of the invention. By way of example, one may choose to use different colors, and/or add additional flashing colors, such as a flashing red airspeed segment before the full red segment occurs. Of course the limits themselves will vary between aircraft, and to a lesser extent, between aircraft operators. Similarly the position (and number) of the displays may vary, though consideration preferably should be given to the fact that the displays should not inhibit the pilots vision, though should be within the immediately perceivable peripheral vision of either (and both) pilots peripheral vision, and the message to be conveyed thereby being substantially immediately understandable by a pilot or pilots without diverting anyone's attention or requiring a "reading" of a display.

As described herein, the AESA Display System may also receive an altitude input, either pressure altitude or an altitude above ground input for automatic activation of the system at the desired altitude during decent, which input can also be factored into the inputs to the display by the system, if desired. In general aviation, wherein an electronic altitude input may not be readily available, the AESA Display System could be manually activated. Also preferably the AESA Display System will include self test capabilities to determine whether it is functioning properly, or if it has lost a required input, is hung-up in one state, etc., together with a capability of communicating that fact to the pilot or pilots, such as by way of changing the display to an unambiguous display of that fact, such as by way of example, a simple black and white pattern, flashing or not.

Thus the present invention has a number of aspects, which aspects may be practiced alone or in various combinations or sub-combinations, as desired. While preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method of providing energy state awareness to pilots of an aircraft during climb, cruise and descent phases of flight comprising:
   a) determining airspeed of the aircraft;
   b) determining a recommended minimum safe airspeed that is appropriate to the aircraft's weight, flap position and normal load factor $n_z$;
   c) determining degree to which the airspeed has deviated above or below the recommended minimum safe airspeed; and
   d) generating, on a display of the aircraft, visual alerts to alert a pilot of the aircraft, wherein the generated visual alerts comprise:
      i) an illumination of a first color, at a first portion of the display, when the airspeed of the aircraft is higher than the recommended minimum safe airspeed by an increment that is less than a pre-determined increment ($\Delta 1$);
      ii) an illumination of a second color, at a second portion of the display, when the airspeed of the aircraft is lower than the recommended minimum safe airspeed by an increment that is greater than a pre-determined increment ($\Delta 2$) but less than a pre-determined increment ($\Delta 3$);
      iii) an illumination of a third flashing color, at a third portion of the display, when the airspeed of the aircraft is higher than stall airspeed but is below the recommended minimum safe airspeed by an increment that is greater than the pre-determined increment ($\Delta 3$); and
      iv) an illumination of a fourth color, at a fourth portion of the display, when the airspeed of the aircraft is equal to or lower than the stall airspeed;
   wherein only one of the generated visual alerts is illuminated at any one time;
   wherein the display is disposed at a lower outer corner of a front window of the aircraft, such that during an approach phase of a landing of the aircraft, the visual alerts are perceivable through the pilot's peripheral field of view without requiring the pilot to divert from the pilot's line-of-sight or to alter the pilot's head or eye position; and
   wherein only the generated visual alerts are illuminated on the display of the aircraft.

2. A method of providing energy state awareness to pilots of an aircraft during approach and landing phases of flight and from a go-around from an aborted landing comprising:
   a) determining airspeed of the aircraft;
   b) determining a recommended approach airspeed that is appropriate to the aircraft's weight, flap position and normal load factor $n_z$;
   c) determining degree to which the airspeed has deviated above or below the recommended approach airspeed; and
   d) generating, on a display of the aircraft, visual alerts to alert a pilot of the aircraft, wherein the generated visual alerts comprise:
      i) an illumination of a first color, at a first portion of the display, when the airspeed of the aircraft is lower than a maximum allowable deviation above a recommended approach airspeed ($\Delta 4$), but higher than a maximum allowable deviation below a recommended approach airspeed ($\Delta 5$);
      ii) an illumination of a second color, at a second portion of the display, when the airspeed of the aircraft is lower than the maximum allowable deviation below the recommended approach airspeed ($\Delta 5$) by an increment that is greater than a pre-determined increment ($\Delta 6$) but is higher than a pre-determined increment ($\Delta 7$) above stall airspeed;
      iii) an illumination of a third flashing color, at a third portion of the display, when the airspeed of the aircraft is lower than the pre-determined increment ($\Delta 7$) above the stall airspeed; and
      iv) an illumination of a fourth color, at a fourth portion of the display, when the airspeed of the aircraft is at or below the stall airspeed;
   wherein only one of the generated visual alerts is illuminated at any one time;

wherein the display is disposed at a lower outer corner of a front window of the aircraft, such that during an approach phase of a landing of the aircraft, the visual alerts are perceivable through the pilot's peripheral field of view without requiring the pilot to divert from the pilot's line-of-sight or to alter the pilot's head or eye position; and wherein only the generated visual alerts are illuminated on the display of the aircraft.

3. The method of claim 1 or 2 wherein the airspeeds are true airspeeds.

4. The method of claim 1 or 2 wherein the airspeeds are indicated airspeeds.

5. The method of claim 1 or 2 wherein the illumination of the first color is an illumination of a color green.

6. The method of claim 1 or 2 wherein the illumination of the second color is an illumination of a color yellow.

7. The method of claim 1 or 2 wherein the illumination of the third flashing color is an illumination of a flashing color yellow.

8. The method of claim 1 or 2 wherein the illumination of the fourth color is an illumination of a color red.

9. The method of claim 1 or 2 further comprising generating aural advisory information corresponding to the visual alerts, wherein generating the aural advisory information corresponding to the visual alerts comprises:
generating no aural advisory when illuminating the first color,
generating aural advisory in a form of a word spoken at a first rate when illuminating the second color,
generating the aural advisory in the form of the word spoken at a second rate when illuminating the third flashing color, and
generating no aural advisory when illuminating the fourth color.

10. The method of claim 1 or 2 wherein the airspeed of the aircraft is taken from an aircraft data bus.

11. The method of claim 1 or 2 wherein the stall airspeed is taken from the aircraft data bus, or determined by a table lookup based at least on aircraft weight, flap position and normal load factor $n_z$; using data supplied by the aircraft manufacturer and aircraft weight, flap setting and normal load factor $n_z$ taken from aircraft data bus.

12. The method of claim 1 wherein the recommended minimum safe airspeed is calculated as a predetermined factor times the stall airspeed.

13. The method of claim 2 wherein the reference approach airspeed is taken from the aircraft data bus or calculated as a predetermined factor times the stall airspeed.

14. The method of claim 2 wherein the maximum allowable deviation above the recommended approach airspeed ($\Delta 4$) is a predetermined airspeed increment recommended by the aircraft manufacturer or aircraft operator.

15. The method of claim 2 wherein the maximum allowable deviation below the recommended approach airspeed ($\Delta 5$) is a predetermined airspeed increment recommended by the aircraft manufacturer or aircraft operator.

16. The method of claim 2 wherein the excessive deviation increments below the recommended approach airspeed ($\Delta 6$) or above the stall airspeed ($\Delta 7$) are predetermined.

17. The method of claim 1 wherein the method is automatically activated when the aircraft ascends through and above a specific altitude.

18. The method of claim 2 wherein the method is automatically activated when the aircraft descends through and below a specific altitude.

19. The method of claim 1 wherein at least one of:
a) the maximum allowable deviation above the recommended minimum safe airspeed;
b) the maximum allowable deviation below the recommended minimum safe airspeed; or
c) the recommended minimum increment above the stall airspeed;
is varied responsive to dynamic effects.

20. The method of claim 2 wherein at least one of:
a) the maximum allowable deviation above the recommended approach airspeed;
b) the maximum allowable deviation below the recommended approach airspeed; or
c) the recommended minimum increment above the stall airspeed;
is varied responsive to dynamic effects such as the rate of change of airspeed.

21. A method of providing energy state awareness to aircraft pilots during climb, cruise and/or descent of an aircraft comprising:
a) determining airspeed of the aircraft;
b) determining a recommended minimum safe airspeed that is appropriate to the aircraft's weight, flap position and normal load factor $n_z$;
c) determining a maximum allowable deviation below the recommended minimum safe airspeed;
d) determining a recommended minimum increment above a stall airspeed;
e) determining an airspeed that corresponds to a minimum certificated airspeed for the aircraft, referred to as the stall airspeed; and
f) generating, on a display of the aircraft, visual alerts to alert a pilot of the aircraft, wherein generating the visual alerts comprises:
i) graphically displaying, at a first portion of the display, a grey color when the airspeed of the aircraft is above a predetermined increment above the recommended minimum safe airspeed;
ii) graphically displaying, at a second portion of the display, a green color when the airspeed of the aircraft is above the recommended minimum safe airspeed, but below the predetermined increment above the recommended minimum safe airspeed;
iii) graphically displaying, at a third portion of the display, a yellow color when the airspeed of the aircraft is below the recommended minimum safe airspeed, but above a predetermined increment above the stall airspeed;
iv) graphically displaying, at a fourth portion of the display, a flashing yellow color when the airspeed of the aircraft is below the recommended minimum increment above the stall airspeed but above the stall airspeed; or
v) graphically displaying, at a fifth portion of the display, a red color when the airspeed of the aircraft is below the stall airspeed;
wherein only one of the generated visual alerts is graphically displayed at any one time;
wherein the display is disposed at a lower outer corner of a front window of the aircraft, such that during an approach phase of a landing of the aircraft, the visual alerts are perceivable through the pilot's peripheral field of view without requiring the pilot to divert from the pilot's line-of-sight or to alter the pilot's head or eye position; and
wherein only the generated visual alerts are graphically displayed on the display of the aircraft.

22. A method of providing energy state awareness to aircraft pilots during approach and landing of an aircraft and during go-around from an aborted landing comprising:
  a) determining airspeed of the aircraft;
  b) determining a recommended approach airspeed that is appropriate to the aircraft's weight, flap position and the normal load factor $n_z$;
  c) determining a maximum allowable deviation above the recommended approach airspeed;
  d) determining a maximum allowable deviation below the recommended approach airspeed;
  e) determining a recommended minimum increment above a stall airspeed;
  f) determining the stall airspeed; and
  g) generating, on a display of the aircraft, visual alerts to alert a pilot of the aircraft, wherein generating the visual alerts comprises:
    i) graphically displaying, at a first portion of the display, a blue color when the airspeed of the aircraft is above the maximum allowable deviation above the recommended approach airspeed;
    ii) graphically displaying, at a second portion of the display, a green color when the airspeed of the aircraft is below the maximum allowable deviation above the recommended approach airspeed, but above the maximum allowable deviation below the recommended approach airspeed;
    iii) graphically displaying, at a third portion of the display, a yellow color when the airspeed of the aircraft is below the maximum allowable deviation below the recommended approach airspeed, but above the recommended minimum increment above the stall airspeed;
    iv) graphically displaying, at a fourth portion of the display, a flashing yellow color when the airspeed of the aircraft is below the recommended minimum increment above the stall airspeed but above the stall airspeed; or
    v) graphically displaying, at a fifth portion of the display, a red color when the airspeed of the aircraft is below the stall airspeed;
  wherein only one of the generated visual alerts is graphically displayed at any one time;
  wherein the display is disposed at a lower outer corner of a front window of the aircraft, such that during an approach phase of a landing of the aircraft, the visual alerts are perceivable through the pilot's peripheral field of view without requiring the pilot to divert from the pilot's line-of-sight or to alter the pilot's head or eye position; and
  wherein only the generated visual alerts are graphically displayed on the display of the aircraft.

* * * * *